United States Patent
Propheter-Hinckley et al.

(10) Patent No.: US 10,113,441 B2
(45) Date of Patent: Oct. 30, 2018

(54) THERMALLY DRIVEN SPRING VALVE FOR TURBINE GAS PATH PARTS

(71) Applicant: UNITED TECHNOLOGIES CORPORATION, Hartford, CT (US)

(72) Inventors: Tracy A. Propheter-Hinckley, Manchester, CT (US); Lane M. Thornton, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 421 days.

(21) Appl. No.: 14/990,528

(22) Filed: Jan. 7, 2016

(65) Prior Publication Data
US 2017/0198600 A1 Jul. 13, 2017

(51) Int. Cl.
*F01D 17/10* (2006.01)
*F01D 17/12* (2006.01)
(Continued)

(52) U.S. Cl.
CPC ............. *F01D 17/12* (2013.01); *F01D 5/189* (2013.01); *F01D 9/02* (2013.01); *F01D 17/105* (2013.01);
(Continued)

(58) Field of Classification Search
CPC .......... F01D 5/186; F01D 5/188; F01D 5/189; F01D 9/02; F01D 11/18; F01D 17/085;
(Continued)

(56) References Cited

U.S. PATENT DOCUMENTS

| 1,697,004 A | 1/1929 | Friedrich |
| 6,485,255 B1 * | 11/2002 | Care ...................... F01D 5/187 |
| | | 415/12 |

(Continued)

FOREIGN PATENT DOCUMENTS

| CA | 2504757 | 10/2006 |
| CH | 287967 | 12/1952 |

(Continued)

OTHER PUBLICATIONS

Extended European Search Report dated May 29, 2017 in European Application No. 17150576.1.

Primary Examiner — Woody Lee, Jr.
Assistant Examiner — Jesse Prager
(74) Attorney, Agent, or Firm — Snell & Wilmer L.L.P.

(57) ABSTRACT

A thermally driven spring valve for turbine gas path parts is disclosed herein. A thermally driven spring valve includes a bimetallic sheet comprising a base, a first finger portion extending from the base and a second finger portion extending from the base, the first finger portion having a first curvature vector and the second finger portion have a second curvature vector, wherein an exterior surface extends from the base through the first finger portion and the second finger portion and an interior surface extends from the base through the first finger portion and the second finger portion, wherein the exterior surface of the first finger portion is disposed proximate the interior surface of the base wherein the exterior surface of the second finger portion is disposed proximate the interior surface of the base. A thermally driven spring valve may include perforations through a finger portion.

14 Claims, 8 Drawing Sheets

(51) Int. Cl.
    *F01D 25/12*     (2006.01)
    *F01D 9/02*     (2006.01)
    *F01D 5/18*     (2006.01)
    *F16K 15/16*     (2006.01)

(52) U.S. Cl.
    CPC .............. *F01D 25/12* (2013.01); *F16K 15/16* (2013.01); *F05D 2220/32* (2013.01); *F05D 2240/12* (2013.01); *F05D 2240/126* (2013.01); *F05D 2240/81* (2013.01); *F05D 2260/20* (2013.01); *F05D 2300/143* (2013.01); *F05D 2300/17* (2013.01); *F05D 2300/50212* (2013.01)

(58) Field of Classification Search
    CPC ........ F01D 17/105; F01D 17/12; F16K 15/16; F05D 2240/12; F05D 2240/126; F05D 2300/143; F05D 2300/17; F05D 2300/50212

See application file for complete search history.

(56) References Cited

U.S. PATENT DOCUMENTS

| | | | |
|---|---|---|---|
| 2011/0129330 A1* | 6/2011 | Farrell | F01D 5/141 415/12 |
| 2013/0312425 A1 | 11/2013 | Thornton et al. | |
| 2014/0248120 A1* | 9/2014 | Graves | F01D 11/005 415/1 |

FOREIGN PATENT DOCUMENTS

| | | |
|---|---|---|
| EP | 1584789 | 10/2005 |
| EP | 1936468 | 6/2008 |
| GB | 2354290 | 3/2001 |

\* cited by examiner

THERMALLY DRIVEN SPRING VALVE FOR TURBINE GAS PATH PARTS

FIELD

The present disclosure relates to gas turbine engines, and more specifically, to turbine bleed air cooling systems for a gas turbine engine components and turbine section stator cooling.

BACKGROUND

Static vane airfoils and other turbine parts may incorporate a cooling circuit which passes coolant, typically compressor bleed air, through the surface of the airfoil and into the turbine gas path. The amount of compressor bleed air passed through a part is typically determined by that part's hottest running condition to ensure that the part will survive that condition. For a typical operating cycle, a part spends little time at its maximum operating temperature. Thus, for the majority of its operating time, more compressor bleed air than is needed may be flowed through the part. Engine efficiency typically decreases as compressor bleed air through a part increases.

SUMMARY

In various embodiments, the present disclosure provides a thermally driven spring valve comprising a bimetallic sheet comprising a base, a first finger portion extending from the base and a second finger portion extending from the base. In various embodiments, the first finger portion has a first curvature vector and the second finger portion has a second curvature vector, wherein an exterior surface extends from the base through the first finger portion and the second finger portion and an interior surface extends from the base through the first finger portion and the second finger portion. In various embodiments, the exterior surface of the first finger portion is disposed proximate the interior surface extending from the base, and the exterior surface of the second finger portion is disposed proximate the interior surface extending from the base.

In various embodiments, a finger portion comprises a perforation. In various embodiments, the bimetallic sheet comprises at least one of cobalt, cobalt alloy, platinum, or platinum alloy. In various embodiments, the curvature vector of the first finger portion is variable in accordance with temperature. In various embodiments, the bimetallic sheet has a coefficient of thermal expansion of between about $0.6 \times 10^{-6}$/K and about $15 \times 10^{-6}$/K.

In various embodiments, the present disclosure provides a stator vane for a gas turbine engine comprising a platform, an airfoil extending from the platform, and a thermally driven spring valve disposed within the core and comprising a bimetallic sheet comprising a base, a first finger portion extending from the base, and a second finger portion extending from the base. In various embodiments, the airfoil has a core configured to transmit coolant and extending from the platform into the airfoil, and the core has an axial inner wall and an outer sidewall defining a portion of the airfoil and having a sidewall perforation therethrough configured to allow a flow of coolant from the core through the airfoil. In various embodiments, the first finger portion has a first curvature vector and the second finger portion having a second curvature vector, wherein an exterior surface extends from the base through the first finger portion and the second finger portion and an interior surface extends from the base through the first finger portion and the second finger portion. In various embodiments, the exterior surface of the first finger portion is disposed proximate the interior surface extending from the base, and the exterior surface of the second finger portion is disposed proximate the interior surface extending from the base. In various embodiments, the thermally driven spring valve is disposed within a core, coupled to a core wall at the base, wherein the first finger portion and the second finger portion of the thermally driven spring valve are configured to restrict the flow of coolant through the sidewall perforation.

In various embodiments, a finger portion of the thermally driven spring valve comprises a perforation. In various embodiments, the base of the thermally driven spring valve is coupled to the core by at least one of brazing or welding. In various embodiments, the coolant is bleed air. In various embodiments, the bimetallic sheet comprises at least one of cobalt, cobalt alloy, platinum, or platinum alloy. In various embodiments, the first finger portion has a first coefficient of thermal expansion and the second finger portion has a second coefficient of thermal expansion, the first coefficient of thermal expansion being different from the second coefficient of thermal expansion. In various embodiments, the bimetallic sheet has a coefficient of thermal expansion of between $0.6 \times 10^{-6}$/K and about $15 \times 10^{-6}$/K. In various embodiments, the curvature vector of the first finger portion is variable in accordance with temperature. In various embodiments, a gas path airflow against the stator vane has a temperature of about 1000° F./537° C. to about 2000° F./1093° C.

In various embodiments, the present disclosure provides a thermally driven spring valve comprising a metallic sheet comprising a base mount portion and a floating portion having a curvature vector, wherein the base mount portion is coupled to a wall of a chamber, wherein the floating portion is disposed proximate an aperture in the wall. In various embodiments, the metallic sheet is coupled to the wall of the chamber by at least one of brazing or welding. In various embodiments, the metallic sheet is a bimetallic sheet. In various embodiments, the metallic sheet comprises at least one of steel, titanium, titanium alloy, cobalt, cobalt alloy, platinum, or platinum alloy. In various embodiments, the metallic sheet has a coefficient of thermal expansion of between about $0.6 \times 10^{-6}$/K to about $25 \times 10^{-6}$/K. In various embodiments, the chamber is coupled to a baffle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5B illustrates a thermally driven spring valve in the closed positon, in accordance with various embodiments;

FIG. 5C illustrates a thermally driven spring valve in the open positon, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosureand the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

Figure 1:
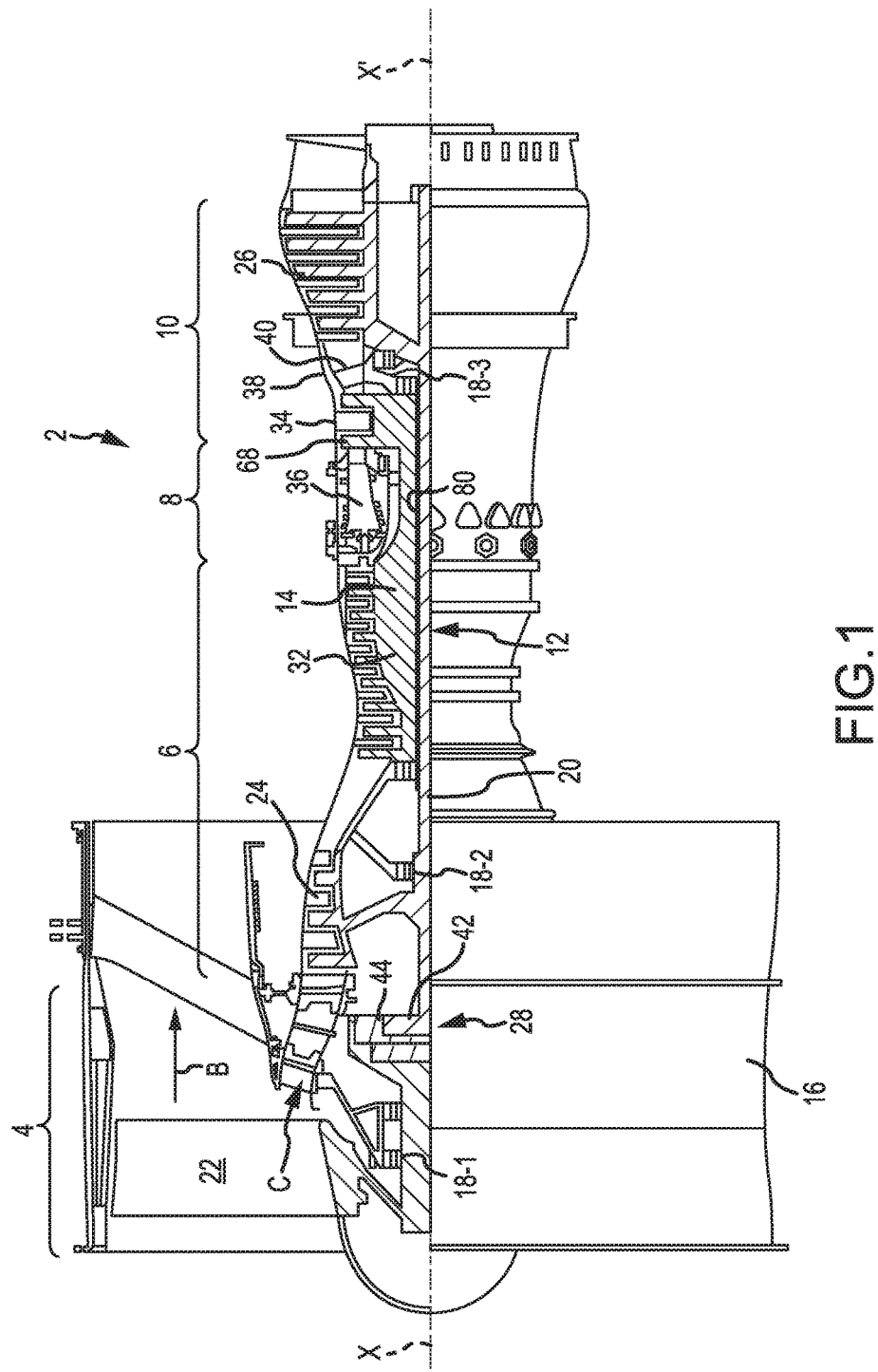
FIG. 1 is a schematic view of a gas turbine engine.

With reference to FIG. 1, an exemplary gas turbine engine 2 is provided. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

A thermally driven spring valve, according to various embodiments, may comprise a metallic or bimetallic sheet comprising one or more finger portions, each having a curvature vector. A metallic sheet (for example, a sheet of metal, a sheet of metal having varying thickness, and/or a bimetallic sheet) may have a coefficient of thermal expansion (CTE) which describes fractional change in length of the sheet with respect to the change in material temperature. Stated another way, the metal may expand lengthways as temperature is increased. In that regard, the CTE may be used to create motion along the length of the metallic or bimetallic sheet as temperature changes.

In various embodiments, a thermally driven spring valve may be disposed in a combustor bleed air gas path, such as in a core of an airfoil (e.g., a stator vane), that is configured to actuate in response to temperature change. In that regard, the amount of combustor bleed air that passes through an airfoil, and thus enters the gas path, may be controlled based upon temperature, for example, the temperature of the airfoil. During operating conditions that result in a relatively higher temperature for an airfoil, the thermally driven spring valve may at least partially open to allow for a greater flow rate of bleed air through the airfoil, thereby increasing cooling capacity during an operating condition that benefits from increased cooling capacity. During operating conditions that result in a relatively lower temperature for an airfoil, the thermally driven spring valve may at least partially close to allow for a reduced flow rate of bleed air through the airfoil, thereby decreasing cooling capacity during an operating condition that benefits from such decreased cooling capacity and reducing the amount of bleed air that flows through the airfoil per unit time.

Figure 4:
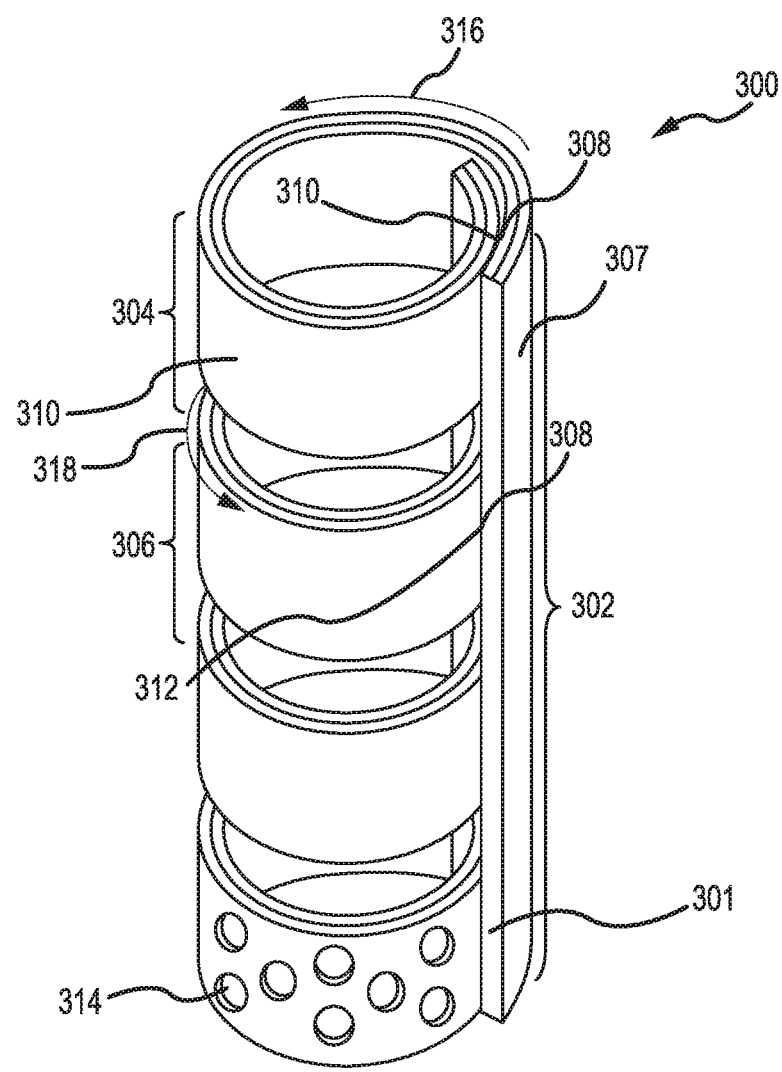
FIG. 4 illustrates a thermally driven spring valve in accordance with various embodiments.

With reference now to FIG. 4, a thermally driven spring valve 300 is formed from a rectangular bimetallic sheet 301 having a base 302 and an interior surface 308 and an exterior surface 307. The bimetallic sheet may have cutouts forming a first finger portion 304 and a second finger portion 306. The bimetallic sheet may be rolled about the base 302 such that interior surface 308 and the exterior surface 307 of the bimetallic sheet 301 extend from the base 302 into the first finger portion 304 and the second finger portion 306 such that the first finger portion 304 have a first exterior surface 310 and the second finger portion 306 has a second exterior surface 312. The fingers are curled to have a desired curvature vector which may vary between fingers such that the first finger portion 304 has a first curvature vector 316 and the second finger portion has a second curvature vector 318. The fingers extend along their individual curvature vectors such that the first exterior surface 310 of first finger portion 304 is disposed proximate to the interior surface 308 extending from the base 302 and the exterior surface 312 is disposed in a similar manner proximate the interior surface 308 extending from the base 302. In various embodiments, one or more finger portions may have perforations 314.

In various embodiments, the bimetallic sheet 301 may be comprised of one or more of platinum, platinum alloy, cobalt, cobalt alloy, other suitable metal, or other suitable metal alloy. In various embodiments, the metallic composition ratio of the bimetallic sheet may vary along a curvature vector of a finger to tailor the CTE. The CTE may be in the range of about $0.6 \times 10^{-6}$/K to about $15 \times 10^{-6}$/K, where the term about in this context only refers to $+/-0.1 \times 10^{-6}$/K.

Figure 2A:
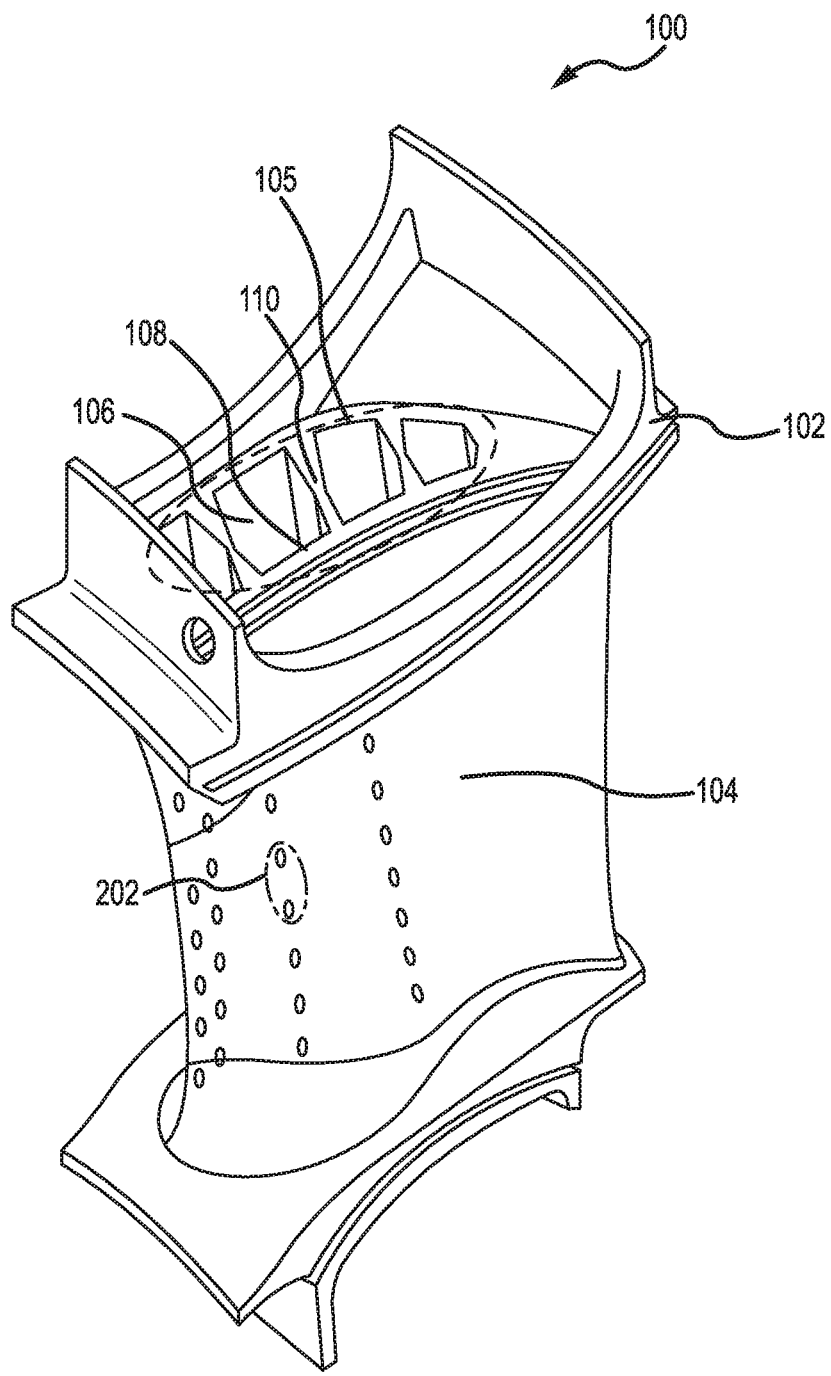
FIG. 2A illustrates a typical turbine section stator vane, in accordance with various embodiments.
Figure 2B:
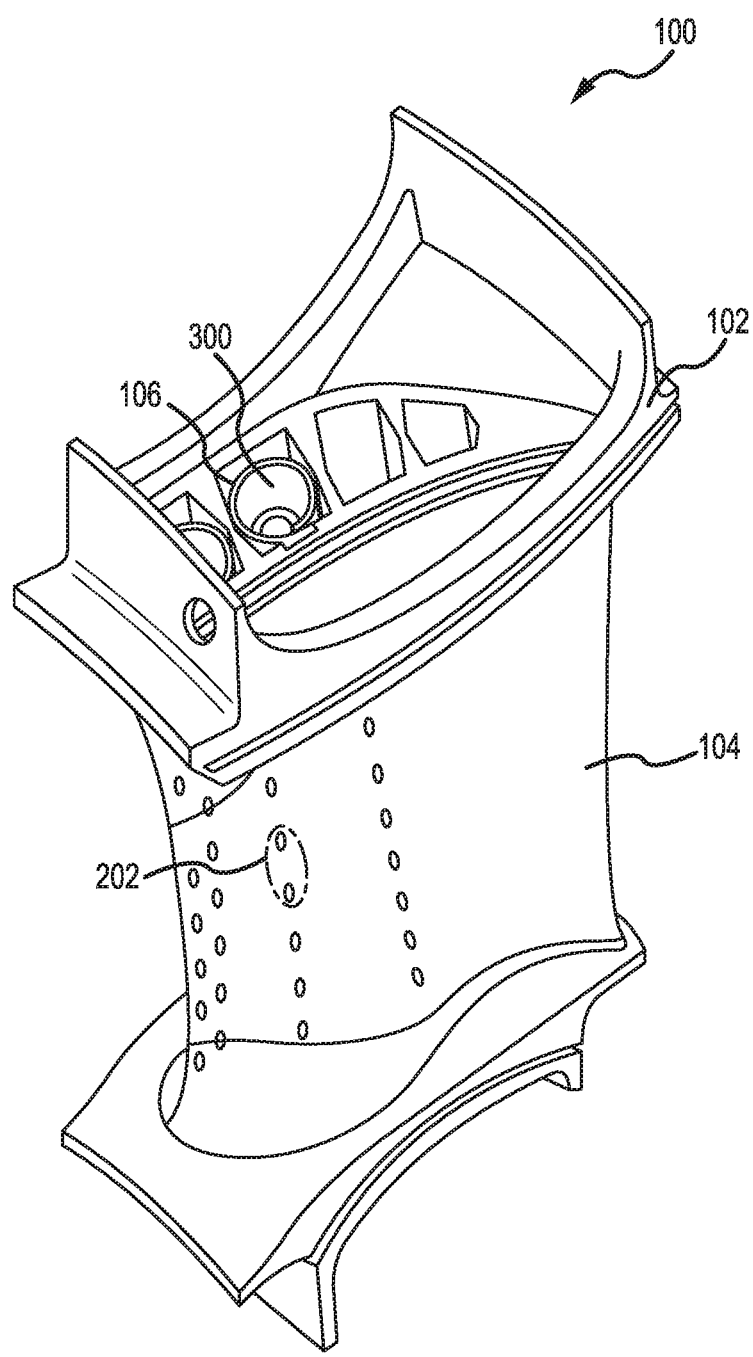
FIG. 2B illustrates a turbine section stator vane incorporating a thermally driven spring valve, in accordance with various embodiments.
Figure 3A:
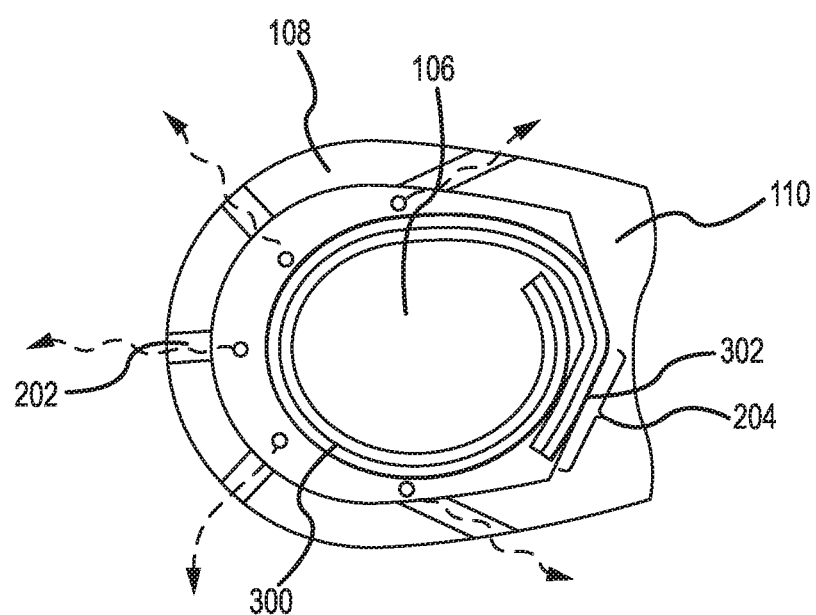
FIG. 3A is a section through the turbine stator vane incorporating a thermally driven spring valve showing the valve in the open condition, in accordance with various embodiments.

In various embodiments and with reference to FIG. 2A and 2B, a gas turbine stator vane 100 is illustrated. The stator vane airfoil 104 extends from platform 102 into the gas path of the gas turbine engine. The gas path airflow may have an extremely high temperature (e.g., 1000° F./537° C. to 2000° F./1093° C. or higher). Cores 105 include core 106. Core 106 has outer sidewall 108, as shown in FIG. 3A, defining a portion of the surface of the stator vane airfoil 104 extending from the platform 102 into the gas turbine stator vane 100. Cores 105 are divided from each other along the airfoil chord by a member between cores, for example, axial inner wall 110 of the core 106. Coolant flows within the cores 105 and exits into the gas path at the surface of the airfoil 104 via perforations such as perforations 202 through the surface of the airfoil 104. A thermally driven spring valve 300 is disposed within core 106 and is configured to regulate coolant flow from the core 106 through the perforations 202.

Figure 3B:
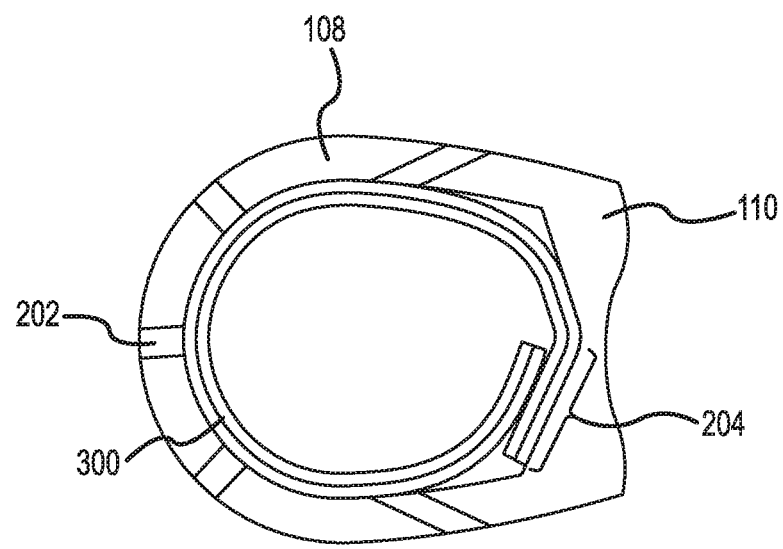
FIG. 3B is a section through the turbine stator vane incorporating a thermally driven spring valve showing the valve in the closed condition, in accordance with various embodiments.

With reference now to FIGS. 3B and 4, in various embodiments, the thermally driven spring valve 300 disposed within core 106. Base 302 is coupled to axial inner wall 110 by, for example, brazing. Thermally driven spring valve 300 may be coupled to axial inner sidewall 110 by any suitable means, for example, by brazing. Brazing surface 204 thus may couple thermally driven spring valve 300 with axial inner wall 110. In various embodiments, however, a brazing surface may couple thermally driven spring valve 300 with outer sidewall 108. In that regard, the heat received by thermally driven spring valve 300 via conduction may be controlled by either brazing to inner sidewall 110 or outer sidewall 108, as outer sidewall 108 typically reaches higher temperatures than inner sidewall 110 during operation. The thermally driven spring valve 300 has first finger portion 304 and second finger portion 306 with first exterior surface 310 and second exterior surface 312, which are configured to be disposed within core 106 and to selectably obstruct the perforations 202. Such obstruction tends to restrict coolant flow through the perforations 202. As heat flows along the axial inner wall 110 into the first finger portion 304 and second finger portion 306, the first curvature vector 316 and second curvature vector 318 of the fingers are altered in proportion to the finger material coefficient of thermal expansion (CTE). Thermally driven spring valve 300 is shown in FIG. 3B in an expanded state.

With reference now to FIGS. 3A and 4, in various embodiments, the change in first curvature vector 316 and second curvature vector 318 driven by thermal flux causes the thermally driven spring valve 300 disposed within core 106 to retract into core 106, away from the outer sidewall 108, thereby allowing coolant to flow from core 106 through perforations 202. Thermally driven spring valve 300 is shown in FIG. 3A in a contracted state.

In various embodiments, one or more finger portions may have perforations 314, as depicted in FIG. 4, to allow coolant to pass through a finger portion, as depicted in FIG. 3B, when the finger portion is an expanded state and would otherwise obstruct coolant flow through one or more perforations in a vane. The perforations 314 may be configured to allow additional coolant flow where thermal conditions do not cause a finger portion to be in a contracted state.

Figure 5A:
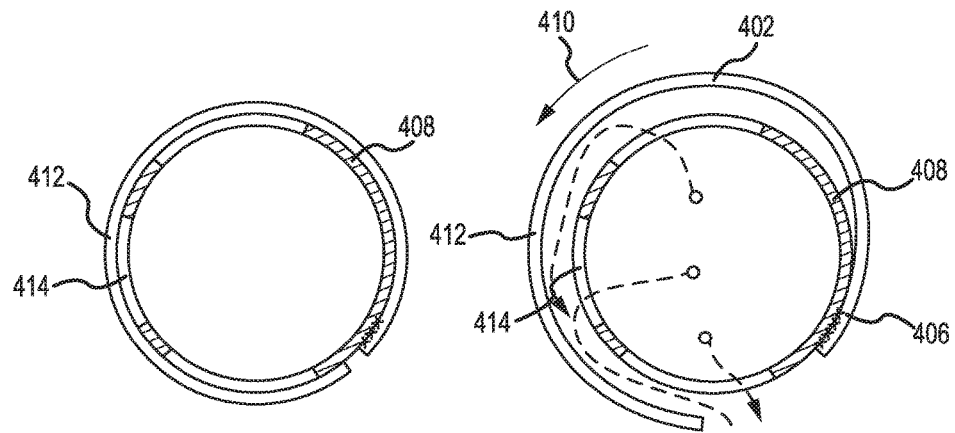
FIG. 5A illustrates a thermally driven spring valve in accordance with various embodiments.
Figure 5A:
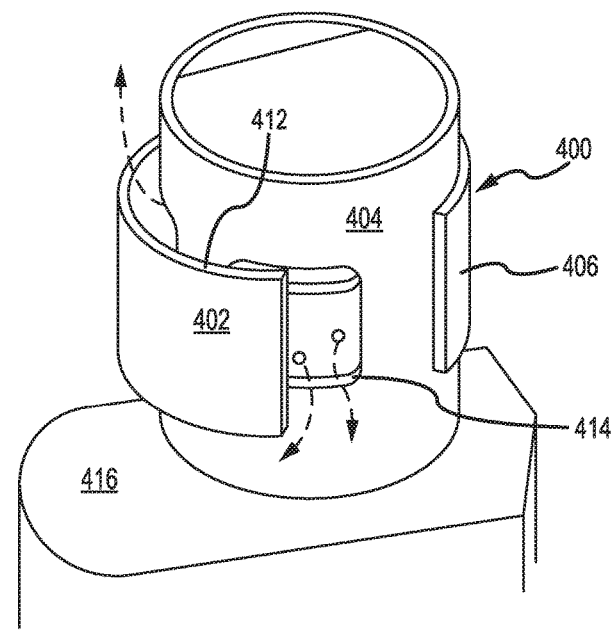

With reference now to FIGS. 5A thru 5C, thermally driven spring valve 400 is illustrated. A metallic sheet 402 having a curvature vector 410, a floating portion 412 and a base mount portion 406 is coupled to an outer surface of wall 408 of a chamber 404. A metallic sheet 402 thus is disposed at least partially circumferentially about wall 408 of a chamber 404. The chamber 404 has aperture 414 in the wall 408 to provide for the flow of coolant in or out of the chamber 404, which may be coupled to and in fluid communication with a baffle 416 (also referred to as plenum 416). The metallic sheet 402 is coupled at the base mount portion 406 to the wall 408 by brazing or by a weld such that the floating portion 412 is disposed proximate to the aperture 414. As shown in FIG. 5B, thermally driven spring valve 400 is in a contracted state. In that regard, floating portion 412 obstructs aperture 414 and thereby prevents coolant from flowing into aperture 414. As shown in FIGS. 5A and 5C, thermally driven spring valve 400 is in an expanded state. In that regard, in response to a change in temperature, floating portion 412 moves away from aperture 414 and thereby allows coolant to flow into aperture 414, thereby allowing coolant to flow into baffle 416.

Figures 5E, 5F:
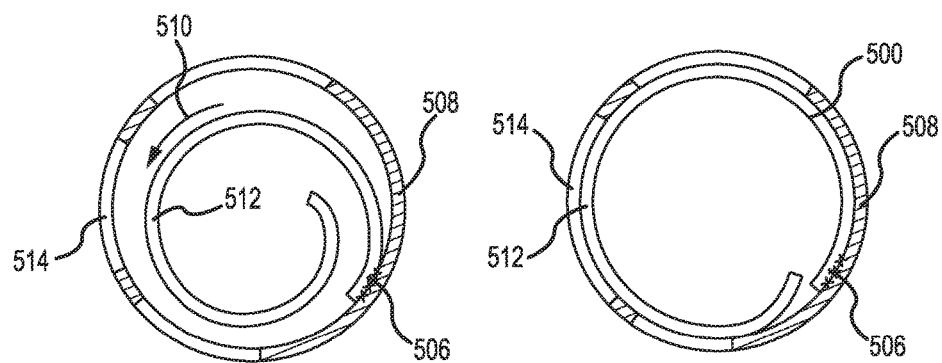
FIG. 5E illustrates a thermally driven spring valve in the open positon, in accordance with various embodiments.
FIG. 5F illustrates a thermally driven spring valve in the closed positon, in accordance with various embodiments.
Figure 5D:
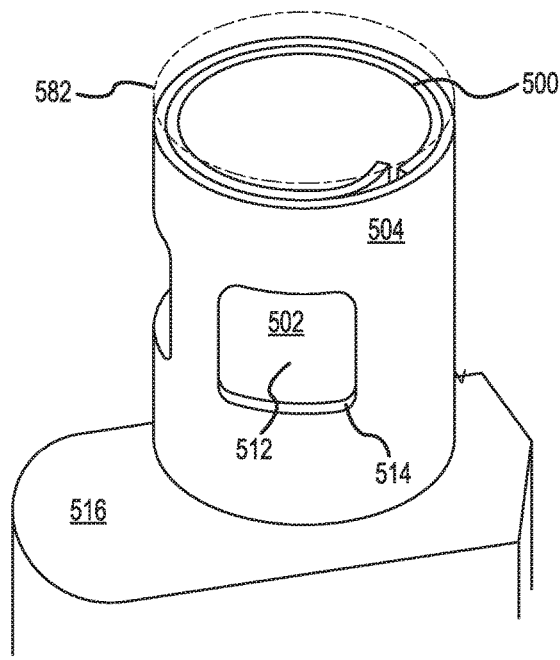
FIG. 5D illustrates a thermally driven spring valve in accordance with various embodiments.

With reference now to FIGS. 5D thru 5F, thermally driven spring valve 500 is illustrated. A metallic sheet 502 having a curvature vector 510, a floating portion 512 and a base mount portion 506 is coupled to an inner surface of wall 508 of a chamber 504. A metallic sheet 502 thus is disposed at least partially circumferentially within wall 508 of a chamber 504. Cap 582 is disposed on top of chamber 504 but is illustrated transparently for the sake of clarity. The chamber 504 has aperture 514 in the wall 508 to provide for the flow of coolant in or out the chamber 504, which may be coupled to and in fluid communication with a baffle 516 (also referred to as plenum 516). The metallic sheet 502 is coupled at the base mount portion 506 to the wall 508 by brazing or by a weld such that the floating portion 512 is disposed proximate to the aperture 514. As shown in FIG. 5E, thermally driven spring valve 500 is in a contracted state. In that regard, floating portion 512 obstructs aperture 514 and thereby prevents coolant from flowing into aperture 514. As shown in FIGS. 5D and 5F, thermally driven spring valve 500 is in an expanded state. In that regard, in response to a change in temperature, floating portion 512 moves away from aperture 514 and thereby allows coolant to flow into aperture 514, thereby allowing coolant to flow into baffle 516.

In various embodiments, to form a thermally driven spring valve such as thermally driven spring valve 300 or thermally driven spring valve 400 or thermally driven spring valve 500, a flat metallic sheet is rolled such that it possesses a curvature vector, then the linear expansion will follow the curvature vector of the rolled sheet. In various embodiments, to form a thermally driven spring valve such as thermally driven spring valve 300, a bimetallic sheet may comprise two metals that have different CTEs. In that regard, the difference in CTE may be used to create motion along a curvature vector during temperature changes as a first metal expands or contracts at a different rate than a second metal, in response to temperature change. Stated another way, a flat bimetallic sheet will expand along a natural curvature vector defined by the difference between the CTEs (e.g. between about $0.6 \times 10^{-6}$/K to about $25 \times 10^{-6}$/K, where the term about in this context only refers to $+/-0.1 \times 10^{-6}$/K) of the selected metals with the curvature vector expansion being larger than the small lengthways expansion. Rolling the bimetallic sheet along this curvature vector may amplify the expansion. Furthermore, by altering the CTE along the bimetallic sheet through use of differing metals or metal compositions at different lengths, the curvature vector may be altered with respect to itself.

In various embodiments the metallic sheet may be steel, titanium, titanium alloy, platinum, platinum alloy, cobalt, cobalt alloy, or a metal. In various embodiments, the metallic sheet may be a bimetallic sheet. The metallic composition ratio of the metallic sheet may vary along the curvature vector of the sheet to tailor the CTE. The CTE of the metallic sheet may be in the range of about thermal expansion in the range of about $0.6 \times 10^{-6}$/K to about $25 \times 10^{-6}$/K.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermally driven spring valve comprising:
   a metallic sheet comprising a base, the sheet having cutouts forming a first finger portion extending from the base and a second finger portion extending from the base, the first finger portion having a first curvature vector and the second finger portion having a second curvature vector,
   wherein the first finger portion, the second finger portion, and the base are monolithic,
   wherein an exterior surface extends from the base through the first finger portion and the second finger portion and an interior surface extends from the base through the first finger portion and the second finger portion,
   wherein the exterior surface of the first finger portion is disposed proximate the interior surface extending from the base,
   wherein the exterior surface of the second finger portion is disposed proximate the interior surface extending from the base.

2. The thermally driven spring valve of claim 1, wherein at least one of the first finger portion or the second finger portion comprises a perforation.

3. The thermally driven spring valve of claim 1, wherein the metallic sheet is bimetallic and wherein the metallic sheet comprises at least one of cobalt, cobalt alloy, platinum, or platinum alloy.

4. The thermally driven spring valve of claim 1, wherein the first curvature vector is variable in accordance with temperature.

5. The thermally driven spring valve of claim 1, wherein the metallic sheet has a coefficient of thermal expansion of between about $0.6 \times 10^{-6}$/K and about $15 \times 10^{-6}$/K.

6. A stator vane for a gas turbine engine comprising:
   a platform;
   an airfoil extending from the platform, the airfoil having a core configured to transmit coolant and extending from the platform into the airfoil, the core having an axial inner wall and an outer sidewall defining a portion of the airfoil and having a sidewall perforation therethrough configured to allow a flow of coolant from the core through the airfoil;
   a thermally driven spring valve disposed within the core and comprising a metallic sheet comprising a base, a first finger portion extending from the base, and a second finger portion extending from the base, the first finger portion having a first curvature vector and the second finger portion having a second curvature vector,
   wherein an exterior surface extends from the base through the first finger portion and the second finger portion and an interior surface extends from the base through the first finger portion and the second finger portion,
   wherein the exterior surface of the first finger portion is disposed proximate the interior surface extending from the base,
   wherein the exterior surface of the second finger portion is disposed proximate the interior surface extending from the base;
   the thermally driven spring valve disposed within the core, coupled to a core wall at the base, wherein the first finger portion and the second finger portion of the thermally driven spring valve are configured to restrict the flow of coolant through the sidewall perforation.

7. The stator vane for a gas turbine engine of claim 6, wherein at least one of the first finger portion or the second finger portion of the thermally driven spring valve comprises a perforation.

8. The stator vane for a gas turbine engine of claim 6, wherein the base of the thermally driven spring valve is coupled to the core by at least one of brazing or welding.

9. The stator vane for a gas turbine engine of claim 6, wherein the coolant is bleed air.

10. The stator vane for a gas turbine engine of claim 6, wherein the metallic sheet is bimetallic and comprises at least one of cobalt, cobalt alloy, platinum, or platinum alloy.

11. The stator vane for a gas turbine engine of claim 6, wherein the first finger portion has a first coefficient of thermal expansion and the second finger portion has a second coefficient of thermal expansion, the first coefficient of thermal expansion being different from the second coefficient of thermal expansion.

12. The stator vane for a gas turbine engine of claim 6 wherein, the metallic sheet has a coefficient of thermal expansion of between $0.6 \times 10^{-6}$/K and about $15 \times 10^{-6}$/K.

13. The stator vane for a gas turbine engine of claim 6, wherein the first curvature vector is variable in accordance with temperature.

14. The stator vane for a gas turbine engine of claim 13, wherein a gas path airflow against the stator vane has a temperature of between 1000° F. to 2000° F.

* * * * *